(12) United States Patent
Seeman et al.

(10) Patent No.: US 9,809,330 B2
(45) Date of Patent: **\*Nov. 7, 2017**

(54) CONTAINER FILLING APPARATUS AND METHOD

(71) Applicant: EINSTEIN NOODLES, LLC, Charleston, SC (US)

(72) Inventors: Daniel Jonathan Seeman, Charlotte, NC (US); Dewey Privette, Charlotte, NC (US); Donna Elizabeth Seeman, Charlotte, NC (US)

(73) Assignee: EINSTEIN NOODLES, LLC, Charleston, SC (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/665,181

(22) Filed: Mar. 23, 2015

(65) Prior Publication Data

US 2016/0023786 A1  Jan. 28, 2016

Related U.S. Application Data

(63) Continuation of application No. 14/192,303, filed on Feb. 27, 2014, now Pat. No. 8,985,164, which is a continuation of application No. 13/408,443, filed on Feb. 29, 2012, now Pat. No. 8,701,721.

(51) Int. Cl.
| | |
|---|---|
| *B65B 3/26* | (2006.01) |
| *B65B 3/30* | (2006.01) |
| *B65B 39/12* | (2006.01) |
| *B65B 57/14* | (2006.01) |
| *B65B 1/36* | (2006.01) |

(52) U.S. Cl.
CPC ............. *B65B 3/30* (2013.01); *B65B 1/36* (2013.01); *B65B 39/12* (2013.01); *B65B 57/145* (2013.01)

(58) Field of Classification Search
CPC .... B65B 3/04; B65B 3/26; B65B 3/30; B65B 1/36; B65B 57/145; B65B 39/12
USPC .............. 141/5, 9, 83, 94–95, 156–157, 181
See application file for complete search history.

(56) References Cited

U.S. PATENT DOCUMENTS

| | | | | |
|---|---|---|---|---|
| 3,702,625 A | * | 11/1972 | Schmidt | B65B 57/06 141/1 |
| 4,508,148 A | * | 4/1985 | Trechsel | B65B 3/36 141/140 |
| 4,859,375 A | * | 8/1989 | Lipisko | C23C 16/4482 137/209 |
| 5,460,210 A | * | 10/1995 | Koeninger | B67D 7/08 141/198 |

(Continued)

*Primary Examiner* — Nicolas A Arnett
(74) *Attorney, Agent, or Firm* — Roeder & Broder LLP; James P. Broder

(57) ABSTRACT

Apparatus and methods are provided for controlling flow of a flowable material. The flowable material passes from a product supply through one or more valves which are coupled to a controller. The controller is also coupled to one or more sensors operable to generate a signal indicating whether flowable product is present or not present at a specific level within a container. The controller is programmed to operate the valves based on signals received from the sensors. The sensors may be associated with the feed container and used to control metering of flowable product out of the feed container, or they may be associated with a container and used to control filling of the container with flowable product.

27 Claims, 8 Drawing Sheets

(56) References Cited

U.S. PATENT DOCUMENTS

| | | | | |
|---|---|---|---|---|
| 5,507,326 A * | 4/1996 | Cadman | B67D 7/342 | 141/1 |
| 6,684,609 B1 * | 2/2004 | Bassissi | B65B 9/20 | 53/451 |
| 6,769,462 B2 * | 8/2004 | Larson | B01F 13/1055 | 141/129 |
| 6,871,678 B2 * | 3/2005 | Guszlovan | B67C 3/30 | 141/198 |
| 7,530,373 B2 * | 5/2009 | Lewis | B01F 15/0416 | 141/100 |
| 8,176,948 B2 * | 5/2012 | Carrig | H04W 4/08 | 141/21 |
| 8,210,215 B2 * | 7/2012 | Lewis | B01F 15/0416 | 141/100 |
| 8,701,721 B2 * | 4/2014 | Seeman | B65B 3/30 | 141/181 |
| 8,985,164 B2 * | 3/2015 | Seeman | B65B 3/30 | 141/181 |
| 2003/0192616 A1 * | 10/2003 | Larson | B01F 13/1055 | 141/2 |
| 2003/0205285 A1 * | 11/2003 | Kelly | B65B 3/04 | 141/2 |
| 2004/0232061 A1 * | 11/2004 | Dillon | A61M 1/1656 | 210/257.2 |
| 2005/0019108 A1 * | 1/2005 | Rainville | B65G 53/24 | 406/171 |
| 2008/0283141 A1 * | 11/2008 | Sutton | C10L 3/00 | 141/1 |
| 2009/0000689 A1 * | 1/2009 | Chen | G01F 11/284 | 141/2 |
| 2009/0025826 A1 * | 1/2009 | Meuleners | F25D 23/126 | 141/351 |
| 2009/0183796 A1 * | 7/2009 | Chase | B67D 1/001 | 141/1 |
| 2010/0175783 A1 * | 7/2010 | Kim | F25D 29/00 | 141/198 |
| 2013/0220477 A1 * | 8/2013 | Seeman | B65B 3/30 | 141/1 |
| 2014/0174589 A1 * | 6/2014 | Seeman | B65B 3/30 | 141/1 |

* cited by examiner

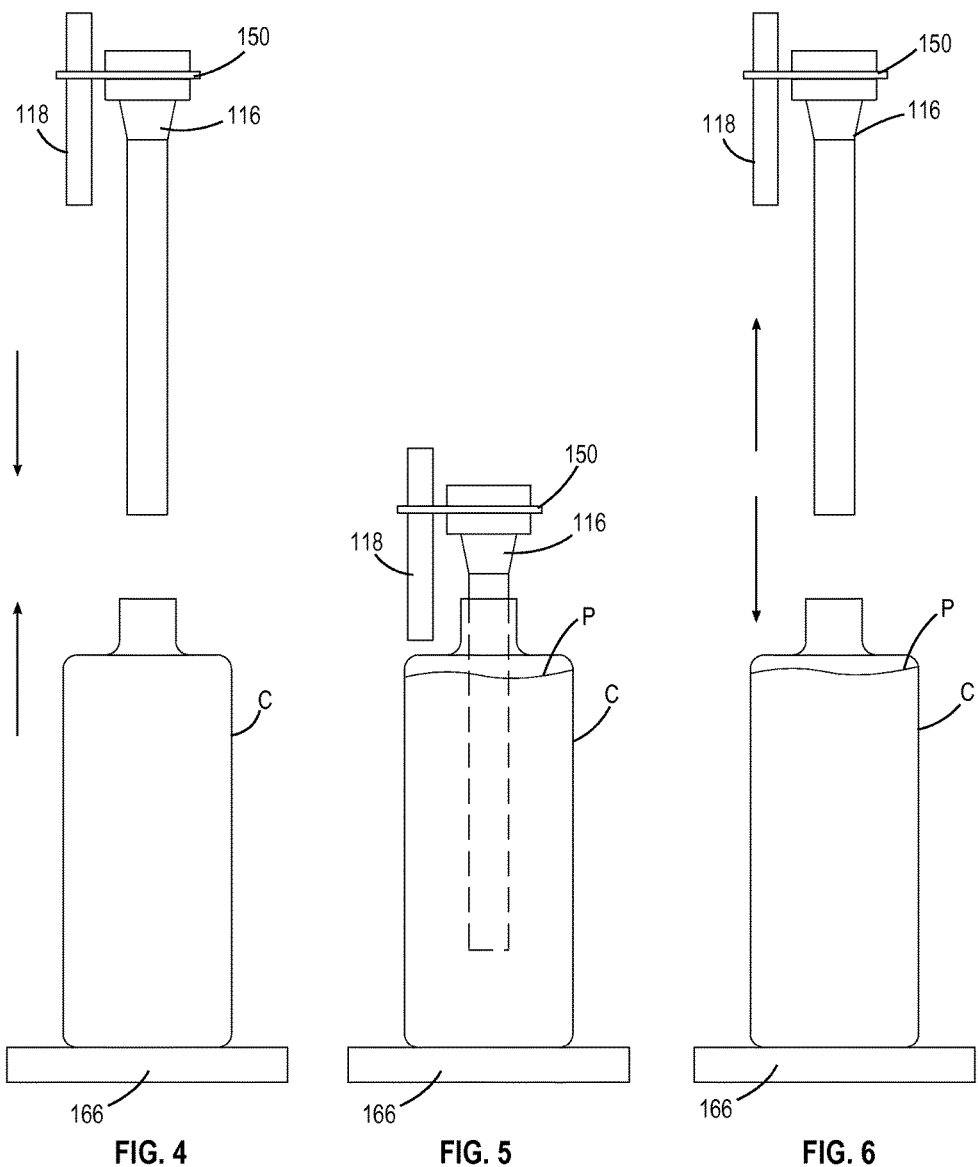

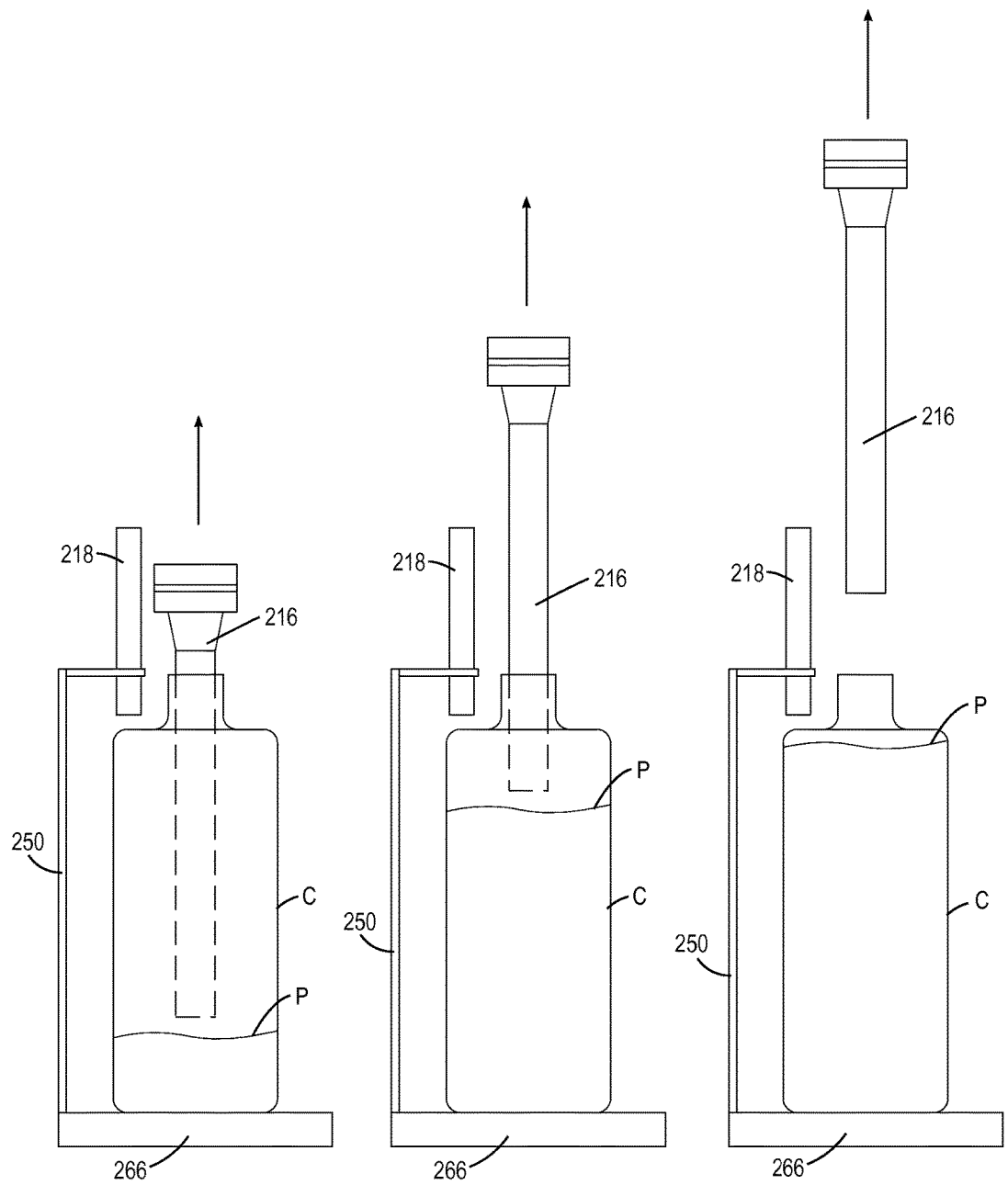

CONTAINER FILLING APPARATUS AND METHOD

BACKGROUND OF THE INVENTION

This invention relates generally to container filling systems and more particularly to container filling systems which determine a container fill level based on direct sensing of products being filled.

Flowable products, particularly products in liquid form are stored, transported, and sold in containers such as bottles and cans. In a small to mass-production environment large numbers of such containers are filled with a known amount of liquid product by filling machines dedicated to that purpose.

Known container filling machinery typically meters the amount of product for a specific container by either weight or volume prior to the container actually being filled. Prior art machinery thus does not use the dynamics of the material being filled to aid in or to be an active participant in the filling process of a container. Furthermore, prior art machinery that meters by weight does not guarantee that a container is filled to proper or desired volume fill level (it could be fooled by foreign objects).

This metering is performed by devices such as gear pumps, diaphragm pumps, piston pumps, peristaltic pumps, flow meters, worm gear, lobe gear pumps, etc. This is an extremely expensive procedure due in part to the cost involved in the pumps, which need to be extremely accurate and reproducible. These pieces of equipment as well as the related flow meters require a further array of very expensive control electronics and equipment.

These systems are also very difficult to clean because of all the intricate pump parts and piping that is required to allow the system to function properly. Another drawback is the sensitivity of these filling machines to viscosity of the product and the temperature of the product and pressure used to fill the product as well as the composition of the product.

Another drawback to these devices is their inability to pump and meter accurately and continuously materials that contain particulate matter within the formula such as pumice in a hand soap. This type of material usually destroys the pump's ability to meter, and causes wear on gear pumps, piston pumps, peristaltic pumps, worm gear pumps, lobe gear pumps, etc.

Accordingly, there is a need for a container filing apparatus which is simple in operation and tolerant to various materials.

BRIEF SUMMARY OF THE INVENTION

This need is addressed by the present invention, which provides a container filling apparatus and process in which the material being filled in a container is a participatory part of the dynamic filling process.

According to one aspect of the invention, a method of filling a container with a flowable product includes: flowing a first flowable product from a product supply through a valve and a nozzle into the container while the container is carried on a support; using a first sensor to determine when the flowable product has reached a first predetermined fill level within the container, and to generate a first filled signal indicative thereof; and based on the first filled signal from the first sensor, closing the valve so as to stop the flow of the first flowable product.

According to another aspect of the invention, a method of filling a container with a flowable product includes: providing at least one product supply comprising at least one feed container containing a flowable product, coupled to a valve and a nozzle; providing at least one support for a container; providing two or more sensors disposed in preselected positions corresponding to different fill levels of flowable product within the container, wherein each sensor is operable to generate a filled signal in response to flowable product reaching one of the fill levels within the container; flowing a flowable product from the at least one product supply through the corresponding valve and nozzle into the container, while the container is carried by the at least one support; using each sensor to generate a filled signal as flowable product reaches a fill level corresponding to that sensor, and in response to each filled signal, either: (a) operating the corresponding valve so as to change the flowrate of the flowable product currently flowing into the container; or (b) operating the corresponding valve to stop the flow of the flowable product and flowing a different flowable product from the at least one product supply through the corresponding valve and nozzle into the container, while the container is carried by the at least one support.

According to another aspect of the invention, an apparatus for filling a container with a flowable product includes: a product supply operable to create a flow of the flowable product; a nozzle; a valve coupled between the product supply and the nozzle; a sensor mounted in a preselected position relative to the apparatus, the sensor operable to generate a filled signal in response to the product reaching a predetermined fill level within the container; and a controller operably coupled to the sensor, wherein the controller is operable to operate the valve in response to the filled signal.

According to another aspect of the invention, a method of metering a flowable product from a feed container includes: providing a product supply comprising a feed container containing a flowable product, coupled to a valve; providing a sensor disposed in a position corresponding to a selected fill level of flowable product within the feed container, wherein the sensor is operable to generate a signal indicating that the flowable product is either present or not present at the selected fill level; flowing a flowable product from the feed container through the valve; and in response to a signal from the sensor indicating that the flowable product is not present, closing the valve to stop the flow of the flowable product.

According to another aspect of the invention, apparatus for metering a flowable product from a feed container, includes: a product supply comprising a feed container, coupled to a valve; a sensor disposed in a position corresponding to a selected fill level of flowable product within the feed container, wherein the sensor is operable to generate a signal indicating that the flowable product is either present or not present at the selected fill level; and a controller operably coupled to the sensor, wherein the controller is programmed to close the valve to stop the flow of the flowable product in response to a signal from the sensor indicating that the flowable product is not present.

BRIEF DESCRIPTION OF THE DRAWINGS

The invention may be best understood by reference to the following description taken in conjunction with the accompanying drawing figures in which:

FIGS. 4-6 are sequential schematic side views of a nozzle and a container during a first type of filling sequence;

FIGS. 7-9 are sequential schematic side views of a nozzle and a container during a second type of filling sequence;

DETAILED DESCRIPTION OF THE INVENTION

Figure 1:
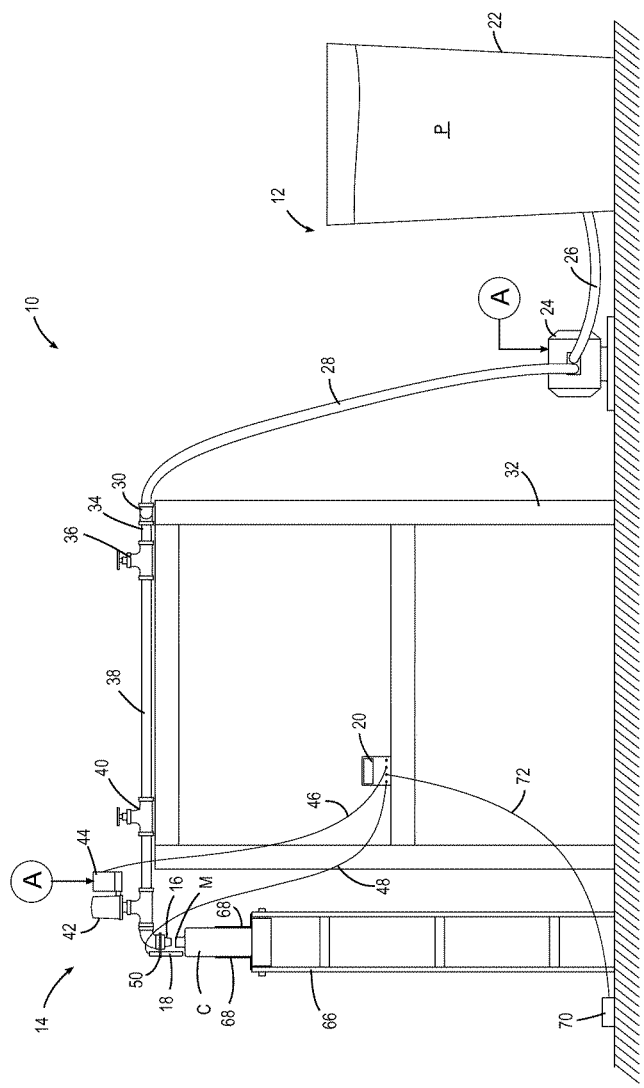
FIG. 1 is a side view of a filling apparatus constructed in accordance with an aspect of the present invention.
Figure 2:
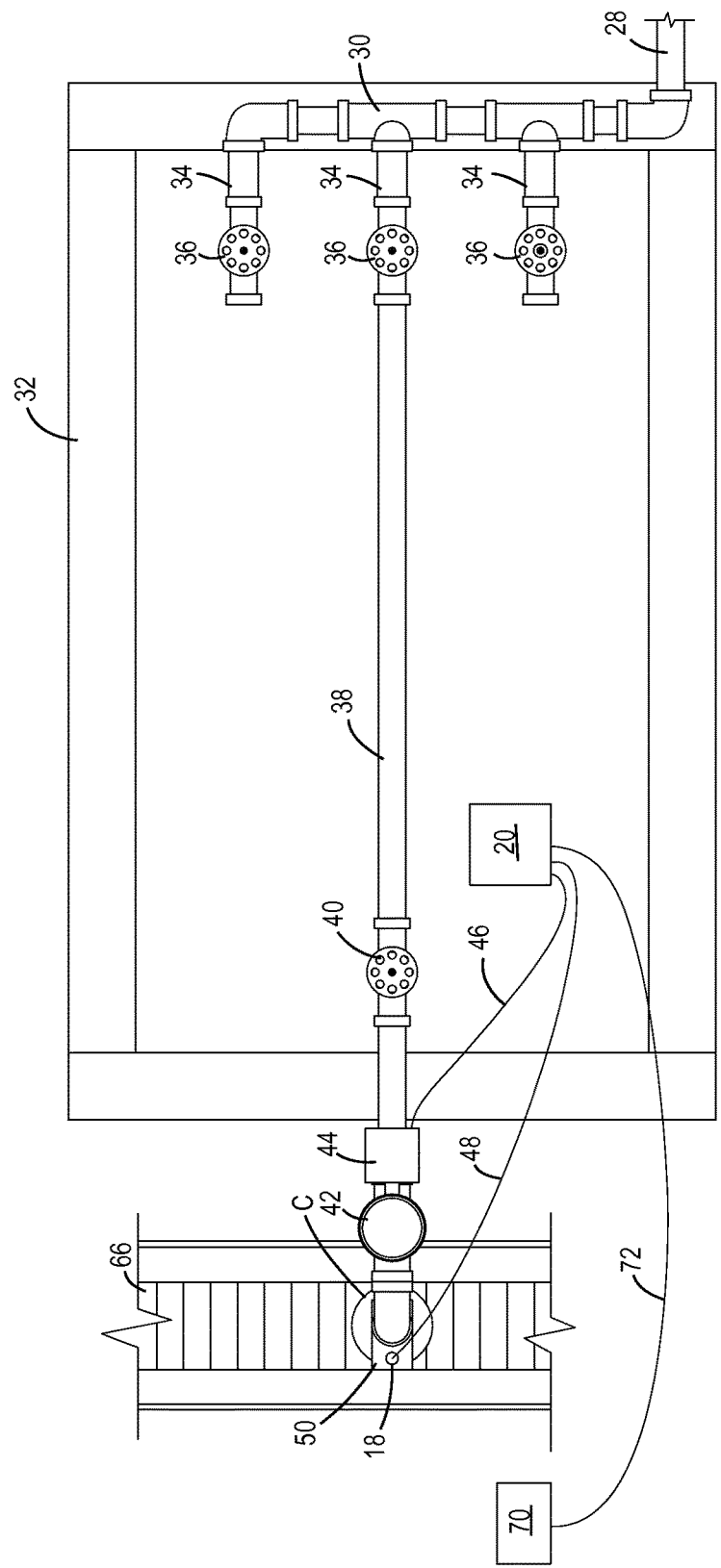
FIG. 2 is a top plan view of the filling apparatus of FIG. 1.

Referring to the drawings wherein identical reference numerals denote the same elements throughout the various views, FIGS. 1 and 2 illustrate an exemplary filling apparatus 10 constructed according to the present invention and used to fill a container "C" with a flowable product. As used herein the term "flowable product" refers to any substance which is capable of deforming under shear stress and flowing, such as granular materials, particulates, powders, liquids, and gases. The basic components of the apparatus 10 are a supply 12 of a flowable product "P", a fill valve assembly 14, a nozzle 16, a product level sensor 18, and a controller 20. Each of these components is described in more detail below.

The supply 12 is configured so that it is operable to cause the product P to flow from the point where it is stored to the nozzle 16. Nonlimiting examples of means for causing flow include pumps, gas pressurization, mechanical feeders such as augers, or gravity flow. The flowable product can be low or high viscosity, or a gel, and can contain solids or abrasives. In the illustrated example, the supply 12 includes at least one feed container 22 housing a flowable product P, coupled to a pneumatically-operated diaphragm pump 24 of a known type by an intake line 26. If desired, multiple containers (not shown) may be coupled to the pump 24, for example where the container C is to be filled with a mixture of two or more products. A compressed air source "A" is connected to the pump 24. A feed line 28 runs from the pump 24 to a manifold 30 which is mounted to a stationary support frame 32. The manifold 30 includes several outlets 34, each with an isolation valve 36. For simplicity of description, only one fill valve assembly 14 and nozzle 16 is shown, however it will be understood that any number of fill valve assemblies 14 and nozzles 16 may be connected to the manifold 30 so as to create multiple filling "stations".

A line 38 runs from the isolation valve 36 to a metering valve 40. The metering valve 40 is an optional component, and if used, may be of a type suitable to throttle the flow to the fill valve apparatus 14 as desired.

The fill valve assembly 14 includes a fill valve 42 connected between metering valve 40 and the nozzle 16. The fill valve 42 is functional to selectively permit flow from the supply 12 to the nozzle 16 or to close off or otherwise operate, i.e. adjust as necessary that flow, in response to commands from the controller 20.

In the illustrated example, the fill valve 42 is a pneumatically operated "pinch valve" of a known type in which introduction of compressed air causes an internal conduit to clamp down or "pinch" off the flow of product P. Such valves are available from Schubert & Salzer, Inc., Concord, N.C. 28027 USA. The fill valve 42 opens when the air supply is cut off.

In the illustrated example, a solenoid 44 is connected between the fill valve 42 and the compressed air source A. The solenoid 44 is connected to the controller 20, for example by a cable 46, and is operable either to permit compressed air flow to the fill valve 42 or to block compressed air flow, in response to the controller 20 or to be manipulated as necessary. While a pinch valve and separate solenoid are used in this example, it will be understood that any type of fill valve (e.g. pinch valve, ball valve, gate valve, rotor valve, butterfly valve, electric valve, pneumatic valve, hydraulic valve, shut-off mechanism, diverting mechanism, etc.) and actuator combination may be used so long as it is operable to selectively permit flow from the supply 12 to the nozzle 16 or to close off or adjust as necessary that flow, in response to commands from the controller 20. In some cases, the fill valve 42 may incorporate an actuator into its structure such that the separate solenoid 44 may not be required.

The nozzle 16 is connected to the downstream end of the fill valve 42. Any type of nozzle effective to form a desired fluid stream or spray pattern may be used. The nozzle 16 may be configured to physically engage the opening in the container C, to be placed through the opening and into the interior of the container C, or simply to be placed in the vicinity of the opening in the container C. In some filling processes, described in more detail below, it is desirable that the nozzle 16 take the form of an elongated tube which extends into the container C during filling.

The product level sensor 18 may be any device operable to determine when the level of the product P in the container C has reached a predetermined fill level. The sensor 18 need only generate a simple binary signal indicating that product is either present or not present within the threshold of the sensor's range. Nonlimiting examples of sensor operational principles include inductance, capacitance, light, sound, heat, air temperature, colorimeter, pH, and nuclear. In the illustrated example, the sensor 18 is a capacitance-type sensor of a known type, which is particularly useful because it is suitable for most container materials, including opaque or transparent containers. Sensors of this type are available from Balluff Inc., Florence, Ky. 41042 USA. The sensor 18 is operably coupled to the controller 20, for example by cable 48. This connection can be wired or wireless.

In the illustrated example, the sensor 18 is mounted by a bracket 50 so that its tip is the proper physical relationship to the container C when the predetermined fill level is reached.

Figure 3:
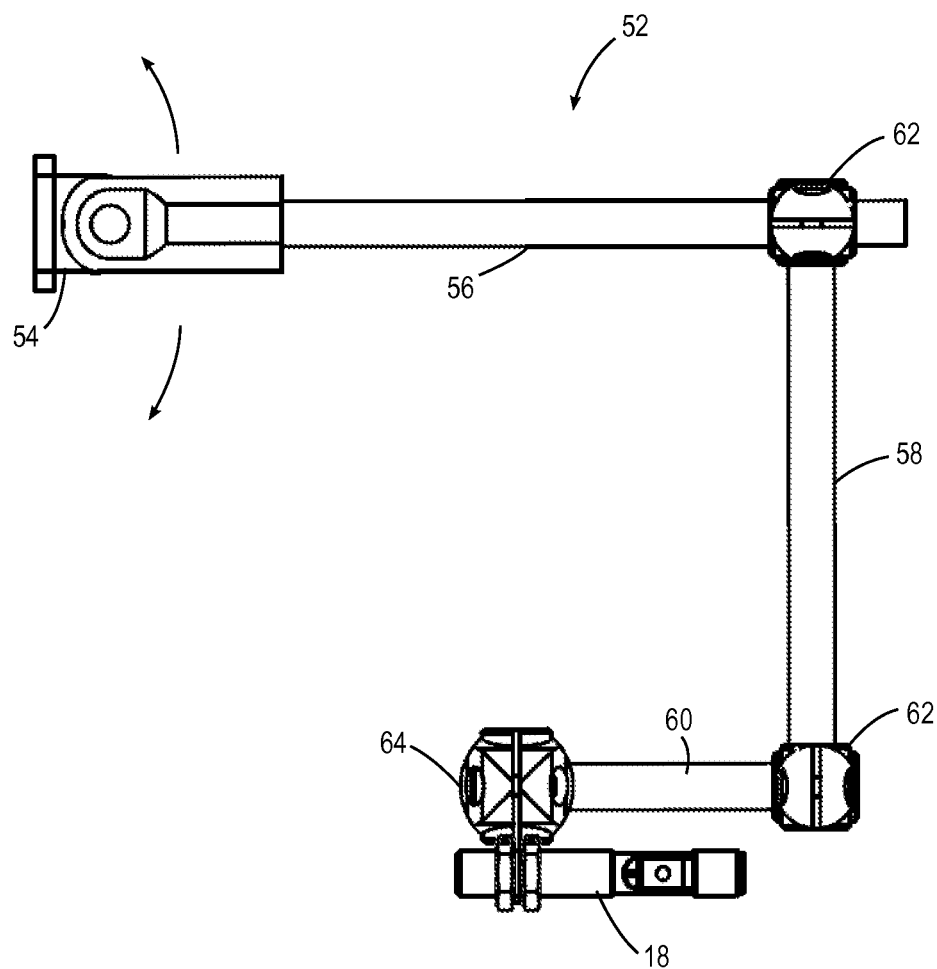
FIG. 3 is a side view of an articulated sensor arm for use with the filling apparatus of FIG. 1.

Other methods may be used to mount the sensor 18. For example, FIG. 3 illustrates an optional articulated arm 52 comprising a pivoting base 54, which would be mounted to a supporting structure. The base 54 is pivotable in at least one plane as shown by the arrows. Extending from the base 54 are several arms (56, 58, and 60), interconnected by clamp-type cross-connectors 62. The last arm 60 carries a holder 64 which in turn carries the sensor 18. The cross-connectors 62 can be loosened and then slide or pivot relative to the arms 56, 58, or 60 as needed.

A conveyor 66 of a known type (such as a belt or roller conveyor, powered or non-powered) is mounted underneath the nozzle 16 and is configured to position a container C with its mouth "M" under the nozzle 16. In the illustrated example, the conveyor 66 includes side rails 68 which align the container C.

The controller 20 may be mounted to the support frame 46. The controller 20 is programmed to open the fill valve 42 in response to an external command, and is programmed to close the fill valve 42 in response to the sensor 18. Any device capable of performing this function may be used as the controller, for example a programmable logic controller ("PLC") or a conventional microcomputer (sometimes referred to as a personal computer or "PC"). A single multi-channel controller may be used to control several fill valves 46. In the particular example shown the controller 20 is a PLC.

Means are provided for triggering the controller 20 to open the fill valve 42. Any type of manual or automatic switch or sensor may be used for this purpose, as required by the specific application. In the illustrated example, a foot switch 70 is connected to the controller 20 with a cable 72.

In operation, the container C is positioned under the nozzle 16. This could be done manually or by moving the container C into position with the conveyor 66. In response to input from the foot switch 70, the controller 20 commands the solenoid 44 to open the fill valve 42. Product P will then flow from the supply 12 through the open fill valve 42 and the nozzle 16 into the container C.

When the product P reaches the predetermined fill level, the output of the sensor 18 will constitute a signal indicative of this fact, referred to herein as a "filled signal". When the controller 20 determines that the fluid level has reached a predetermined fill level, based on the filled signal from the sensor 18, the controller 20 causes the solenoid 44 to close the fill valve 42, stopping the flow of product P. The filling apparatus 10 is then ready to fill another container C. The predetermined fill level is independent from factors such as product temperature, density, viscosity, pressure, compressibility, particulate content, and the like.

A properly filled container C can be used to calibrate the filling apparatus 10. This would be accomplished by first placing the properly filled container C underneath the nozzle 16. Then the filling apparatus 10 is adjusted so that the fill valve 42 just closes. Depending on the exact type of sensor 18 and controller 20 used, the specific adjustment may be a function of the sensor 18, for example a mechanical sensitivity or position adjustment, and/or adjustment of the controller 20, for example an input gain adjustment.

The basic principles described above can be applied to many different filling equipment configurations.

For example, FIGS. 4-6 illustrate a process in which a nozzle moves relative to the container C before and after the filling step, but are stationary to each other during filling. A nozzle 116 (which may be elongated) has a sensor 118 mounted to it by a bracket 150. A container C is carried on a support 166. The support 166 could be any type of moving or stationary mechanism. In FIG. 4, the nozzle 116 is outside the container C and the container C and nozzle 116 are moving relatively towards each other. This relative motion could be a result of the nozzle 116 plunging downward, the container C being lifted by the support 166, or a combination of the two. In FIG. 5, the nozzle 116 is inserted into the container C and the sensor 118 is in the proper position to detect the required fill level in the container C. The product P is at the required fill level and at this moment the nozzle 116 and the container C are stationary with respect to each other. In FIG. 6, filling has been completed and the nozzle 116 and the container C are moving relatively away from each other. This type of nozzle/container relative motion may be found, for example, in semi-automatic or fully automatic filling machines as well as rotary filling machines and "walking beam" filling machines, as described below.

As another example, FIGS. 7-9 illustrate a process in which a nozzle moves relative to the container C during the filling step. A nozzle 216 (which may be elongated) is provided. A container C is carried on a support 266 similar to the support 160 described above. A sensor 218 is mounted to the support by a bracket 250. In FIG. 7, the nozzle 216 is inside the container C, and the container C and nozzle 216 are moving relatively away from each other as product P fills the container C. This relative motion could be a result of the nozzle 216 lifting upward, the container C being lowered by the support 266, or a combination of the two. In FIG. 8, the nozzle 216 is partially lifted upwards relative to the container C and the product P has reached a higher level. The sensor 218 is in the proper position to detect the required fill level in the container C. In FIG. 9, filling has been completed and the nozzle 216 is completely withdrawn from the container C. Because the sensor 218 is stationary relative to the container C, it is always in the proper position to determine when the required fill level has been reached regardless of the relative motion between the nozzle 216 and the container C. This type of nozzle/container relative motion may be found, for example, in in-line filling machines and rotary filling machines, as described below.

Figure 10:
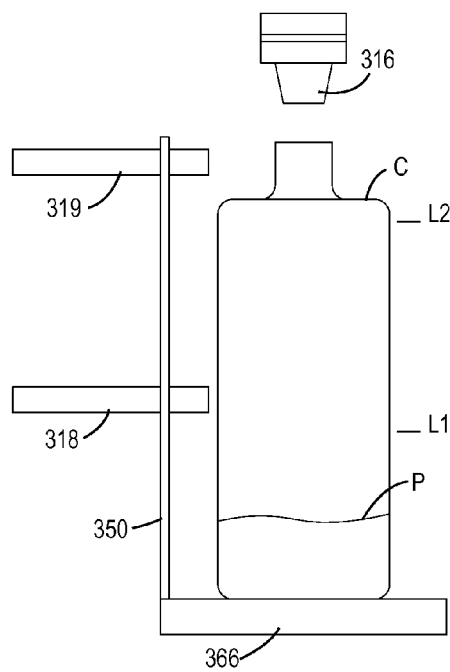
FIGS. 10-11 are sequential schematic side views of a nozzle and a container during a third type of filling sequence.
Figure 11:
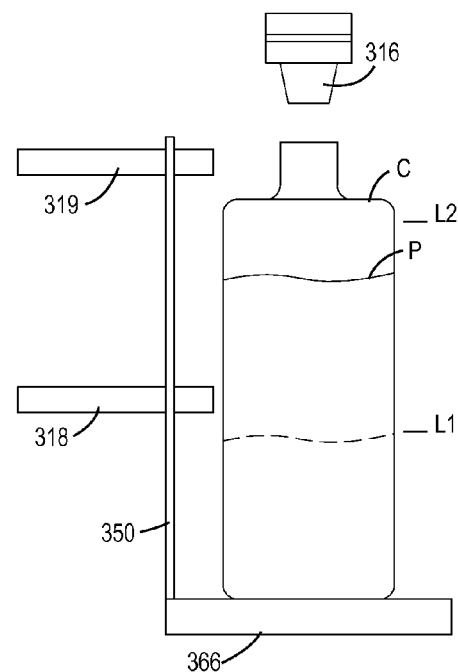

It is possible to use more than one sensor. This may be desired, example, where a container C is to be filled at two or more different rates, or where two or more different materials are to be loaded into the container C in sequence. FIGS. 10 and 11 illustrate such a process. One or more nozzles 316 are provided. A container C is carried on a support 366 similar to the support 160 described above. First and second sensors 318 and 319 are mounted to the support by a bracket 350, at two different levels "L1" and "L2" relative to the container C. In FIG. 10, the container C is being filled and the product P has not reached levels L1 or L2. In FIG. 11, the product has reached level L1, triggering the sensor 318 to generate a filled signal. Once the sensor 318 is triggered, the filling process continues in a second phase, for example by filling the product P at a different rate, by filling with a second, different product from the same nozzle 316, or by filling with a second product from a different nozzle moved into place over the container C. When the product P (or combination of products) has reached the second level L2, triggering the sensor 319 to generate another filled signal, the filling process stops as described above. Multiple sensors may be provided at various fill levels, and the fill process can include changing the product flowrate or changing the product each time one of the sensors is triggered.

Rotary filling machines are the fastest known architecture, because they easily allow for fast, continuous motion of containers. A rotary filling machine comprises a plurality of filling stations, arranged around the circumference of a revolving rotor. Each filling station includes a filling device typically having a nozzle and a container-holding device for securely holding and aligning each container as the containers rotate with the rotor during the filling process. Each nozzle is connected to a hose. The other end of the hose is connected to a product reservoir(s). A conveyor transfers empty containers to an input spindle which synchronously feeds each successive empty container to a filling station. As each container travels around the filling zone with the rotor, the container is filled with product by the filling device. Once the container is filled, it has rotated to an output spindle which removes the container from the filling station and feeds the filled container back to the conveyor. Another section of the conveyor may then transport the filled containers to a capping/lidding machine labeling machine and/or a packing station. Examples of several rotary filling machines are described in U.S. Pat. No. 6,761,191 and U.S. Pat. No. 6,474,368.

In-line filling systems are characterized by the motion of the containers in a generally straight line through the product filling area. There are many types of in-line filling systems but they can be broken down into two types of motion, namely intermittent motion and continuous motion. In the intermittent motion designs, a group of empty containers are serially conveyed or indexed into a plurality of filling stations. The containers are then completely filled while they remain fixed and motionless. Once these groups of containers are filled, an indexing mechanism transports the filled group of containers out of the filling area and another group of empty containers are conveyed into the position of the filling stations. In order to increase the throughput of this type of in-line filling system, various derivative designs have been devised to increase the throughput. These include the multiple parallel lanes and nozzle design, the dead plate pushover design, the shifting nozzle design, and the parallel lane/staggered nozzle design. Each of these designs is described in detail in U.S. Pat. No. 5,878,796.

It is also known to have an in-line filling system which provides for continuous motion of the containers. One such design is the walking beam design. The walking beam filling system comprises a conveyor which transports containers to and from the liquid filling zone. The containers move continuously in a straight line along the conveyor. A bank of nozzles are mounted to a beam. The nozzles are spaced apart such that each nozzle will align with the opening of the same number of containers as the containers travel through the filling zone. The beam is affixed to a motorized beam mechanism which moves the bank of nozzles laterally back and forth and vertically along the same line as the containers on the conveyor. The motorized beam mechanism moves the beam and the bank of nozzles in the direction synchronously with the movement of a group of containers as the containers are filled by the nozzles.

The motorized beam mechanism then returns the beam and nozzles back in the direction at a rate of speed substantially greater than the speed of the conveyor. A filling cycle begins when the beam is accelerated from rest at an initiation point to match the speed of the movement of the continuously moving containers on the conveyor and the nozzles are positioned over the openings in the containers. The nozzles are then lowered into the empty containers entering the filling zone from an input side of the conveyor. The containers are filled with product while the beam, nozzles and containers continue to move synchronously along with the conveyor. Upon completion of the filling, the nozzles are retracted from the containers and the beam is stopped and reversed. The beam moves at a very rapid speed back toward the input side of the conveyor and stops at its initiation point.

In addition to being compatible with different types of filling machine architectures, the principles of the present invention as described above are compatible with many known filling techniques, some of which are summarized as follows:

Bottom-up filling: Used for foamy products, or to reduce splashing, nozzles are lowered to the bottom of the container C before filling and then rise just above the liquid as the container C is being filled.

Locate Filling: Used for non-foamy products; nozzles are located into the neck of the container C, the product fills, and then the nozzles are pulled out. Higher production rates can typically be achieved using this method.

Static Filling: This filling technique is typically used for filling machines with no nozzle movement. Many semi-automatic or fully automatic filling machines use this type of filling.

Profile Filling: Using servomotor technology allows the speed of the filling process inside the container C to vary. For instance, the product may require filling at a fast speed for the first half of the fill and then slowing down for the second half of the fill.

Flammable/Hazardous Material Filling: Any product that is flammable or hazardous, i.e. defined as those liquids with a flashpoint of 38° C. (100° F.) or less, needs to be filled using an intrinsically-safe machine to assure that the filling process is safe for those working nearby.

Hot Fill: This technique is used with products that must be heated and filled at elevated temperatures. Some products such as sauces, condiments, and food ingredients may need to maintain an elevated temperature during the filling process in order to assure a sanitary environment of the closed container C; others like deodorants, candles, lipstick, and mascara use the hot fill technique since the product is either too thick or a solid at room temperature, and therefore, unable to flow through the pumps.

Figure 12:
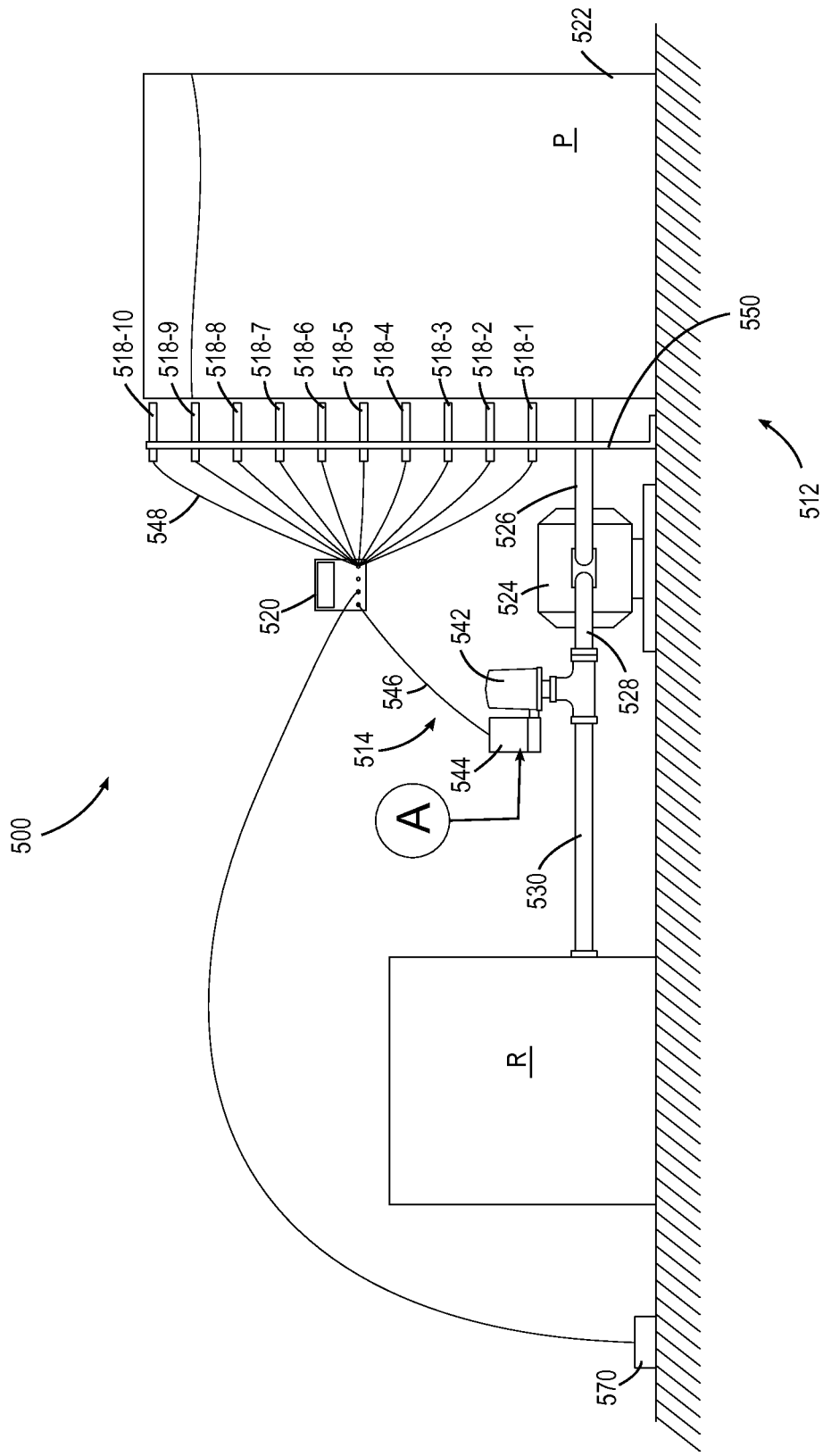
FIG. 12 is a side view of a metering apparatus constructed in accordance with an aspect of the present invention.

It is also possible to use one or more sensors to control a flowable product metering process. For example, FIG. 12 shows a metering apparatus 500, used to meter a flow of flowable product from a feed container. The basic components of the apparatus 500 are a supply 512 of a flowable product P as described above, a metering valve assembly 514, one or more product level sensors 518, and a controller 520. Each of these components is described in more detail below.

The supply 512 is configured so that it is operable to cause the flowable product P to flow from the point where it is stored to the metering valve 512. Nonlimiting examples of means for causing flow include pumps, gas pressurization, mechanical feeders such as augers, or gravity flow. In the illustrated example, the supply 512 includes at least one feed container 522 housing the flowable product P, coupled to a pump 524 by an intake line 526. A feed line 528 runs from the pump 524 to the metering valve assembly 514.

The metering valve assembly 14 is connected by a discharge line 530 to a receiver "R". The receiver R may be any container, apparatus, or process that requires metered amounts of the flowable product P. For example, the receiver R could be a washing machine, mixer, compounder, coater, or other similar device.

The metering valve assembly 514 is functional to selectively permit flow from the supply 512 to the discharge line 530 or to close off that flow, in response to commands from the controller 520.

In the illustrated example, the metering valve assembly 514 includes a metering valve 542. The metering valve 542 is a pneumatically operated "pinch valve" identical to valve 42 described above, and a solenoid 544 is connected between the fill valve 542 and the compressed air source A. The solenoid 544 is connected to the controller 520, for example by a cable 546, and is operable either to permit compressed air flow to the fill valve 542 or to block compressed air flow, in response to the controller 520 or to be manipulated as necessary. All of the alternative configurations described above for the fill valve assembly 14 are equally applicable to the metering valve assembly 514.

An array of product level sensors (referred to generally at 518) are mounted by a bracket 550 so that their tips are in the proper physical relationship to the feed container 522. Each sensor 518 corresponds to a specific fill level of the feed container 522. In the illustrated example, there are 10 equally-spaced sensors 518, and for reference, the sensors 518 are labeled 518-1 through 518-10. The spacing between sensors 518 can be set so that it corresponds to a specific increment of product volume.

Each product level sensor 518 may be any device operable to determine when the level of the product P in the feed container 522 is at a predetermined fill level. The sensor 518 need only generate a simple binary signal indicating that product is either present or not present within the threshold of the sensor's range. Nonlimiting examples of sensor operational principles include inductance, capacitance, light, sound, heat, air temperature, colorimeter, pH, and nuclear. In the illustrated example, the sensors 518 are capacitance-type sensors identical to the sensors 18 described above. Each sensor 518 is operably coupled to the controller 520, for example by cables 548. This connection can be wired or wireless.

Operation of the metering apparatus begins with product P at a known level in the feed container 522. For example, as seen in FIG. 12, the product P is approximately at the level of the ninth sensor 518-9, and all of the sensors 518 below the ninth sensor 518-9 would generate a signal indicating "present". In response to input from a foot switch 570 or other suitable trigger, the controller 520 commands the solenoid 544 to open the metering valve 542. Product P will then flow from the supply 512 through the open metering valve 542 into the receiver R.

As the product P leaves the feed container 522, each sensor 518 will change state sequentially. For example, when the product falls below the trigger range of the eighth sensor 518-8, its signal will change from "present" to "not present".

The controller 520 is programmed to stop the fill process when selected sensors 518 have changed signal state from "present" to "not present". When the selected sensors 518 have changed state, the controller 520 causes the solenoid 544 to close the fill valve 542, stopping the flow of product P. The metering apparatus 500 is then ready for another metering cycle.

The controller 520 may be programmed to simply count how many sensors 518 have changed state, or it may track independent inputs. For example, if the feed container 522 is to be emptied from sensor 518-9 to sensor 518-6, the controller 520 could be programmed to either count that three sensors 518 have changed state, or it could be programmed to identify that "not present" signals have been received from each of sensors 518-8, 518-7, and 518-6. Any number of sensors 518 can constitute a metering cycle, and the number can be different each time.

Figure 13:
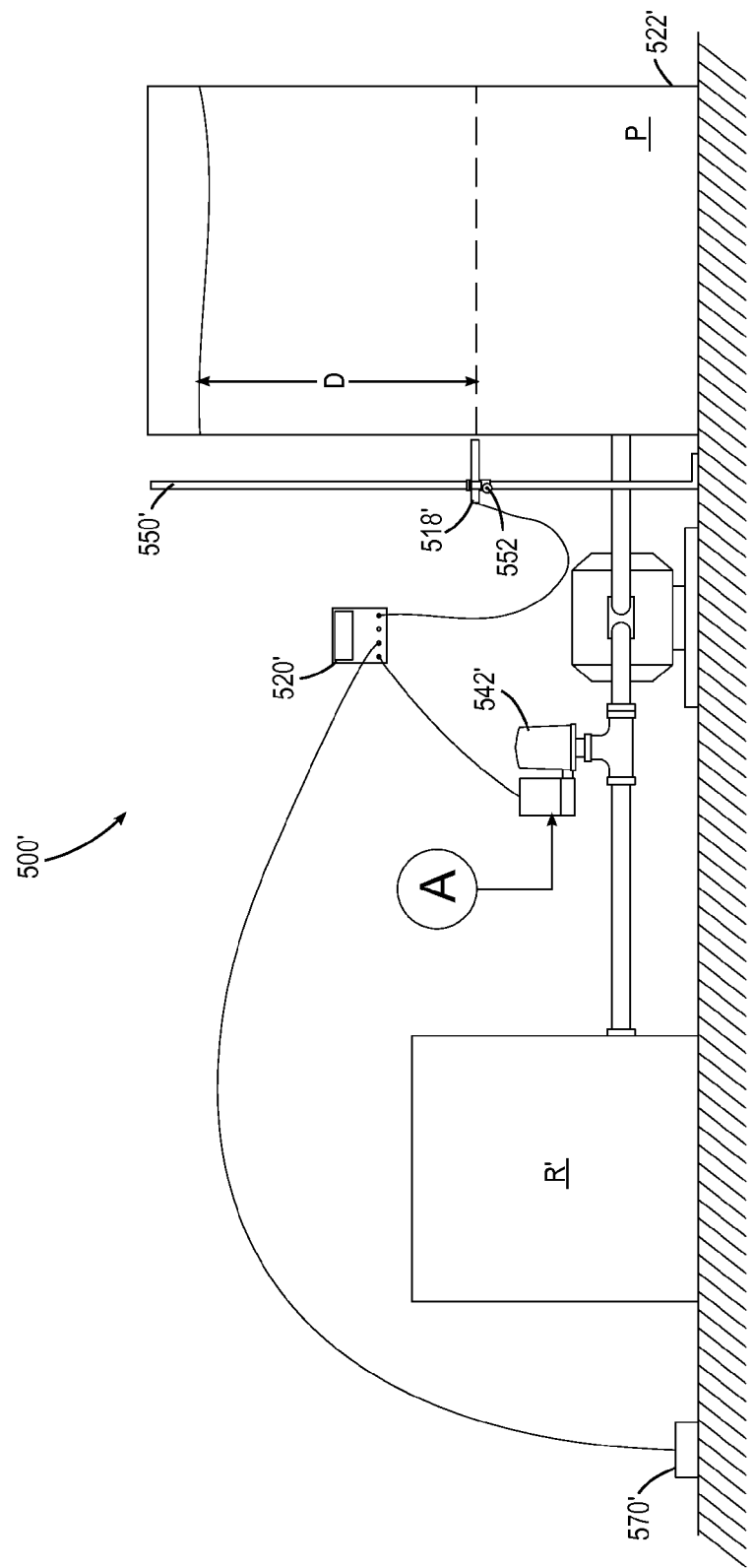
FIG. 13 is a side view of a metering apparatus incorporating an alternative sensor assembly.

FIG. 13 illustrates another metering apparatus 500' generally identical to the metering apparatus 522 described above, having a feed container 522', metering valve 542', controller 520', and receiver R'. The apparatus 522' has an alternative sensor configuration. A single sensor 518' (identical to the sensors 518 described above) is mounted to an upright elongated bracket 550' by a moveable holder 552. The metering apparatus 522' is operated by first moving the holder 552 to set the sensor 518' at a desired level below the current level of flowable product P in the feed container 522'. In response to input from a foot switch 570' or other suitable trigger, the controller 520' opens the metering valve 542'.

Product P will then flow from the feed container 522' through the open metering valve 542' into the receiver R'. The controller 520' is programmed to close the metering valve 542' and stop the fill process when the sensor 518' changes signal state from "present" to "not present". The volume of product P discharged depends on the distance "D" from the starting level of the product P to the position of the sensor 518'. This distance D can be set however needed for a particular metering cycle.

The apparatus and method described above have several advantages over the prior art. It allows for materials with particulate matter to be filled. Its operation allows viscosity changes due in part to temperature, pressure or batch-to-batch variation. The filling apparatus 10 can fill containers C with a wide range of liquid viscosities, meaning anything that can be made to flow can be measured. Nonlimiting examples of liquids that can be filled using the apparatus include sulfuric acid (0.2 centipoise, water-thin and free flowing) to maple syrup (144 centipoise, semi-viscous) to tomato paste (190,000 centipoise and extremely viscous). The filling apparatus 10 is streamlined and can be easily setup and cleaned-up with minimal product waste. It allows for a quick change over of different size bottles, containers, pouches, etc. and quick product changeovers. Neither the filling apparatus 10 nor the metering apparatus 500 requires expensive metering pumps, or complicated hoses and electronics. Also, they can simplify rotary systems, by eliminating the need for mechanical, manual or electrical filled timing.

The foregoing has described a container filling apparatus and method. While specific embodiments of the present invention have been described, it will be apparent to those skilled in the art that various modifications thereto can be made without departing from the spirit and scope of the invention.

What is claimed is:

1. An apparatus for filling a container with a flowable product from a product supply, the apparatus comprising:
   a filling station that receives the flowable product from the product supply, the filling station including (i) a fill valve, (ii) a nozzle connected to a downstream end of the fill valve and configured to direct the flowable product into the container, and (iii) a capacitive sensor configured so that during a filling operation the capacitive sensor is operable (A) to sense, through the container, when the flowable product reaches a predetermined fill level within the container, and (B) to generate a signal in response to the sensing of the flowable product reaching the predetermined fill level within the container, the capacitive sensor being positioned entirely outside the container and at least a portion of the capacitive sensor being positioned below a mouth of the container being filled during the filling operation, wherein the capacitive sensor is positioned remotely from the flowable product and does not physically contact the container during the filling operation, and wherein the positioning of the capacitive sensor is adjustable so that different predetermined fill levels within a container can be selected by adjusting the positioning of the capacitive sensor; and
   a controller operably coupled to the capacitive sensor, the controller being configured to close the fill valve in response to receiving the generated signal from the capacitive sensor to stop flow of the flowable product into the container.

2. The apparatus of claim 1, wherein the flowable product contains an abrasive.

3. The apparatus of claim 1 further comprising a support configured to carry the container, wherein the nozzle and the support are configured to move relative to each other.

4. The apparatus of claim 3, wherein the capacitive sensor is fixedly positioned relative to the support during the filling operation.

5. The apparatus of claim 1, wherein the capacitive sensor is fixedly positioned relative to the nozzle during the filling operation.

6. The apparatus of claim 1, wherein the fill valve includes a pinch valve.

7. The apparatus of claim 1, wherein the product supply includes a feed container and a pump.

8. The apparatus of claim 1, wherein the controller includes a programmable logic controller.

9. The apparatus of claim 1, wherein the apparatus is configured to fill the container with a gel.

10. The apparatus of claim 1, wherein the apparatus is configured to fill the container with a hand soap.

11. The apparatus of claim 1, wherein the capacitive sensor is configured to be positioned above the container during the filling operation.

12. The apparatus of claim 1, wherein the capacitive sensor is configured to be positioned above a shoulder of the container, but below the mouth of the container, during the filling operation.

13. The apparatus of claim 1, wherein the capacitive sensor is configured to be positioned proximate a shoulder of the container during the filling operation.

14. The apparatus for filling containers with a flowable product of claim 1, further comprising a bracket, the capacitive sensor being mountable to the bracket in a manually adjustable manner to allow positioning of the capacitive sensor relative to the apparatus prior to the filling operation.

15. The apparatus of claim 1, wherein the capacitive sensor is elongate and includes a distal tip directed toward, and a portion of the capacitive sensor is positioned above the mouth of, the container being filled during the filling operation.

16. The apparatus of claim 1, wherein the capacitive sensor is elongate and includes a distal tip directed toward, and positioned above a shoulder but below the mouth of, the container being filled during the filling operation.

17. The apparatus of claim 1, wherein the capacitive sensor is elongate and includes a distal tip directed toward, and positioned proximate a shoulder of, the container being filled during the filling operation.

18. A method for filling a container with a flowable product from a product supply, the method comprising the steps of:
  (a) directing the flowable product from the product supply into the container with a nozzle connected to a downstream end of a fill valve of a filling station;
  (b) positioning a capacitive sensor remotely from the flowable product so that the capacitive sensor does not physically contact the container during a filling operation, the capacitive sensor being positioned entirely outside the container and at least a portion of the capacitive sensor being positioned below a mouth of the container being filled during the filling operation;
  (c) sensing through the container with the capacitive sensor when the flowable product reaches a predetermined fill level within the container;
  (d) generating a signal in response to the sensing of the flowable product reaching the predetermined fill level within the container;
  (e) coupling a controller to the capacitive sensor; and
  (f) closing the fill valve with the controller in response to receiving the generated signal from the capacitive sensor to stop flow of the flowable product into the container at the filling station.

19. The method of claim 18 further comprising the step of adjusting the positioning of the capacitive sensor at the filling station so that different predetermined fill levels within the container can be selected.

20. The method of claim 18, wherein the flowable product includes an abrasive.

21. The method of claim 18, wherein the flowable product includes a gel.

22. The method of claim 18, wherein the flowable product includes a hand soap.

23. The method of claim 18, wherein at the filling station a portion of the capacitive sensor is positioned above the mouth of the container during a filling operation.

24. The method of claim 18, wherein at the filling station the capacitive sensor is positioned above a shoulder of the container, but below the mouth of the container, during a filling operation.

25. The method of claim 18, wherein at the filling station the capacitive sensor is positioned proximate a shoulder of the container during a filling operation.

26. An apparatus for filling a container with a flowable product from a product supply, the apparatus comprising:
  a filling station that receives the flowable product from the product supply, the filling station including (i) a fill valve, (ii) a nozzle connected to a downstream end of the fill valve and configured to direct the flowable product into the container, and (iii) a capacitive sensor configured so that during a filling operation the capacitive sensor is operable (A) to sense, through the container, when the flowable product reaches a predetermined fill level within the container, and (B) to generate a signal in response to the sensing of the flowable product reaching the predetermined fill level within the container, wherein the capacitive sensor is elongate and includes a distal tip directed toward, and positioned above a shoulder but below a mouth of, the container being filled during the filling operation, wherein the capacitive sensor is positioned remotely from the flowable product and does not physically contact the container during the filling operation, and wherein the positioning of the capacitive sensor is adjustable so that different predetermined fill levels within a container can be selected by adjusting the positioning of the capacitive sensor; and
  a controller operably coupled to the capacitive sensor, the controller being configured to close the fill valve in response to receiving the generated signal from the capacitive sensor to stop flow of the flowable product into the container.

27. A method for filling a container with a flowable product, the method comprising the steps of:
  directing the flowable product from a product supply into the container with a nozzle connected to a downstream end of a fill valve of a filling station;
  positioning a capacitive sensor remotely from the flowable product so that the capacitive sensor does not physically contact the container during a filling operation, wherein at the filling station the capacitive sensor is positioned above a shoulder of the container and below a mouth of the container during a filling operation;

sensing through the container with the capacitive sensor when the flowable product reaches a predetermined fill level within the container;

generating a signal in response to the sensing of the flowable product reaching the predetermined fill level within the container;

coupling a controller to the capacitive sensor; and closing the fill valve with the controller in response to receiving the generated signal from the capacitive sensor to stop flow of the flowable product into the container at the filling station.

\* \* \* \* \*